United States Patent [19]
Myers

[11] Patent Number: 5,675,456
[45] Date of Patent: Oct. 7, 1997

[54] ACOUSTIC VIBRATION DECOUPLER FOR A DISK DRIVE PIVOT BEARING ASSEMBLY

[75] Inventor: David K. Myers, Campbell, Calif.

[73] Assignee: Western Digital Corporation, Irvine, Calif.

[21] Appl. No.: 561,340

[22] Filed: Nov. 21, 1995

[51] Int. Cl.$^6$ ..................................................... G11B 5/55
[52] U.S. Cl. ...................... 360/106; 360/97.02; 384/536
[58] Field of Search ...................... 360/106, 97.01–97.02; 384/220, 536

[56] References Cited

U.S. PATENT DOCUMENTS

| | | | |
|---|---|---|---|
| 2,551,621 | 5/1951 | Michelsen | 384/536 |
| 2,874,008 | 2/1959 | Orte et al. | 308/184 |
| 2,897,023 | 7/1959 | Burkhalter et al. | 308/184 |
| 4,900,165 | 2/1990 | Kun et al. | 384/220 |
| 5,033,875 | 7/1991 | Moulinet | 384/536 |
| 5,214,549 | 5/1993 | Baker et al. | 360/97.02 |
| 5,282,100 | 1/1994 | Tacklind et al. | 360/97.02 |
| 5,483,398 | 1/1996 | Boutaghou | 360/97.02 |
| 5,501,531 | 3/1996 | Hamaekers | 384/536 |

FOREIGN PATENT DOCUMENTS 1 625 611  8/1973  Germany.

*Primary Examiner*—John H. Wolff
*Attorney, Agent, or Firm*—Leo J. Young; W. Chris Kim

[57] ABSTRACT

A vibration decoupler for a swing-type head actuator pivot bearing assembly in a disk drive. The invention selectively decouples axial actuator vibrations from the pivot shaft while retaining the radial and rotational rigidity needed to ensure head positioning precision. The head stack assembly is rigidly coupled to the pivot bearing shaft in the radial and rotational dimensions and is pliably coupled to the same shaft in the axial dimension. This decoupling scheme eliminates most acoustic vibration components created in the rotary actuator. Axial decoupling eliminates most acoustic vibration components transmitted from the pivot shaft to the drive housing. The vibration isolator may be fabricated as a single piece of injection-molded plastic, including all necessary elements for coupling to the pivot bearing and the actuator body.

18 Claims, 3 Drawing Sheets

ACOUSTIC VIBRATION DECOUPLER FOR A DISK DRIVE PIVOT BEARING ASSEMBLY

CROSS-REFERENCES TO RELATED APPLICATIONS

This application is related by subject matter to the commonly assigned application entitled "Disk Drive Having Elastomeric Bearing Interface in Pivot Bearing Assembly" (Assignee Docket No. K35A0205) filed on even date herewith as U.S. patent application Ser. No. 08/561,344, which is entirely incorporated herein by this reference.

BACKGROUND OF THE INVENTION

1. Field of the Invention

This invention relates generally to disk drives and specifically to an acoustic isolator for decoupling acoustic actuator vibrations in an actuator pivot bearing assembly.

2. Description of the Related Art

A well-known disk drive includes a rotary actuator for positioning a read/write head with respect to the data-recording surface of a rotating disk. The rotary actuator includes a head stack assembly and a pivot bearing assembly. Improved data storage performance in such disk drives has generally led to increased disk rotation velocity and increased head actuator movement frequency. Both of these improvements introduce unwanted acoustic noise that is coupled through the disk spindle bearing and actuator pivot bearing to the disk drive housing, where it is introduced into the environment. The unwanted acoustic noise created in high-performance disk drives is a serious problem for the personal computer user, who may be less than one meter from the noisy disk drive. This contributes to a major source of unwanted environmental acoustic noise, which is the sympathetic vibration of the disk drive housing resulting from direct acoustic coupling to the disk spindle and the rotary actuator pivot bearings.

The head stack assembly pivots about an actuator pivot axis, which is rigidly fixed with respect to the drive housing. The disk rotates about a spindle axis that is also rigidly fixed with respect to the disk drive housing. Proper drive performance requires maintenance of a fixed spatial relationship between the spindle and pivot axes. Any significant transient change in relative position of these two axes may introduce transient head positioning errors that reduce disk drive performance.

Both the actuator pivot bearing shaft and the disk spindle motor shaft are usually rigidly coupled to the disk drive housing to reduce the overall height of the disk drive and to ensure that the actuator pivot axis is always locked into a fixed spatial relationship with the disk spin axis.

Practitioners in the art have proposed numerous solutions to the environmental acoustic noise problem in disk drives. Some practitioners have proposed improvements to the spindle bearing and pivot bearing designs intended to reduce the amount of acoustic noise created therein. Many others propose solutions that involve the addition of compliant isolation members between noise sources (actuator and disk bearings) and the external environment.

For instance, in U.S. Pat. No. 5,214,549, Jonathan Baker et al. disclose an acoustically damped disk drive assembly that relies on a layered housing cover to reduce acoustic transmissivity. Baker et al. teach the use of a cover having a plurality of plate members, each pair of which embrace a damping layer disposed to dampen internal acoustic vibrations imparted to the cover. Their damping layer is preferably a lossy viscoelastic material that decouples (lossless) and absorbs (lossy) acoustic energy transferred between each pair of plate members.

Similarly, in U.S. Pat. No. 5,282,100, Thomas Tacklind et al. disclose a miniaturized disk drive assembly that relies on means for sound damping and mechanical isolation in a continuous peripheral lip region of a cover to reduce transmitted acoustic noise. Tacklind et al. disclose a cover that is mechanically decoupled from the internal structure by a continuous air space.

Some practitioners have proposed elements for absorbing vibrations in the disk bearing shaft and the actuator pivot shaft before transmission to the external housing. Disadvantageously, interposing lossy viscoelastic material between the actuator pivot shaft and the external housing permits the shaft to move too easily with respect to other fixed components, which reduces head-positioning precision and could introduce unwanted errors into the head-positioning motion of the actuator arm. The actuator pivot shaft is preferably rigidly anchored to the drive housing to minimize head positioning errors that may result from small changes in the pivot axis.

Other practitioners have also proposed adding some sort of viscoelastic bushing within the pivot bearing assembly to provide acoustic isolation of the pivot shaft from the actuator bearing. This solution is seldom satisfactory because its effectiveness is limited by the inherent conflict between precise actuator positioning control and effective vibration absorption or dampening. That is, the viscoelastic material should be soft enough to absorb acoustic vibrations and also should be rigid enough to eliminate unacceptable changes in the effective actuator pivot axis.

Accordingly, there is a clearly-felt need in the art for an effective mechanism for decoupling actuator vibrations from the stationary pivot shaft without softening the actuator-to-pivot coupling in the radial and rotational dimensions. Without vibration isolation that is also radially and rotationally stiff, practitioners are obliged to trade off head positioning precision for reductions in unwanted environmental acoustic noise. These unresolved problems and deficiencies are clearly felt in the art and are solved by this invention in the manner described below.

SUMMARY OF THE INVENTION

This invention solves the acoustic isolation problem in actuator pivot bearings by introducing a selective lossless decoupler within the pivot bearing assembly. The acoustic vibration decoupler of this invention retains rigid radial and rotational coupling while decoupling axial vibrations in the acoustic frequency region. This decoupler exploits the unexpectedly advantageous observation that most acoustic actuator vibration occurs longitudinally with respect to the pivot axis and is transmitted axially therefrom to the external drive housing.

It is a feature of the vibration decoupler of this invention that the inner and outer elements are coupled by means of several pliable elements, each of which is positioned and configured to provide radial and rotational rigidity with axial pliability at acoustic frequencies.

It is an object of this invention to decouple actuator vibrations from the pivot bearing shaft without reducing head positioning precision. It is an advantage of this invention that axial actuator vibrations are decoupled from the pivot shaft without materially reducing either radial or rotational coupling rigidity.

It is another object of this invention to reduce environmental acoustic noise at the disk drive housing without materially increasing fabrication cost. It is another advantage of this invention that the vibration decoupler may be fabricated from low-cost materials in a single step. It is a feature of this invention that it incorporates in a single piece the inner and outer elements necessary for coupling to both the pivot bearing and actuator body.

The foregoing, together with other objects, features and advantages of this invention, can be better appreciated with reference to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein like reference designations represent like features and wherein.

DETAILED DESCRIPTION OF THE PREFERRED EMBODIMENTS

Figure 1:
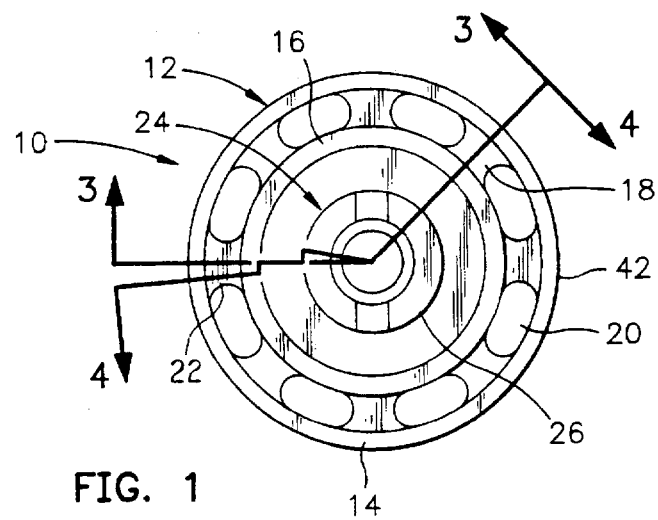
FIG. 1 shows a top plan view of a pivot bearing assembly incorporating a preferred embodiment of the vibration decoupler of this invention.
Figure 2:
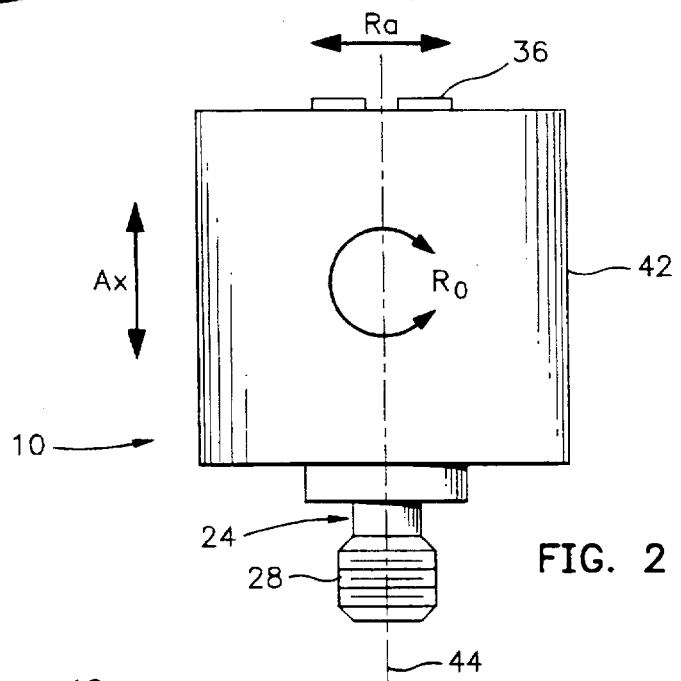
FIG. 2 is a side plan view of the pivot bearing assembly of FIG. 1.
Figure 3:
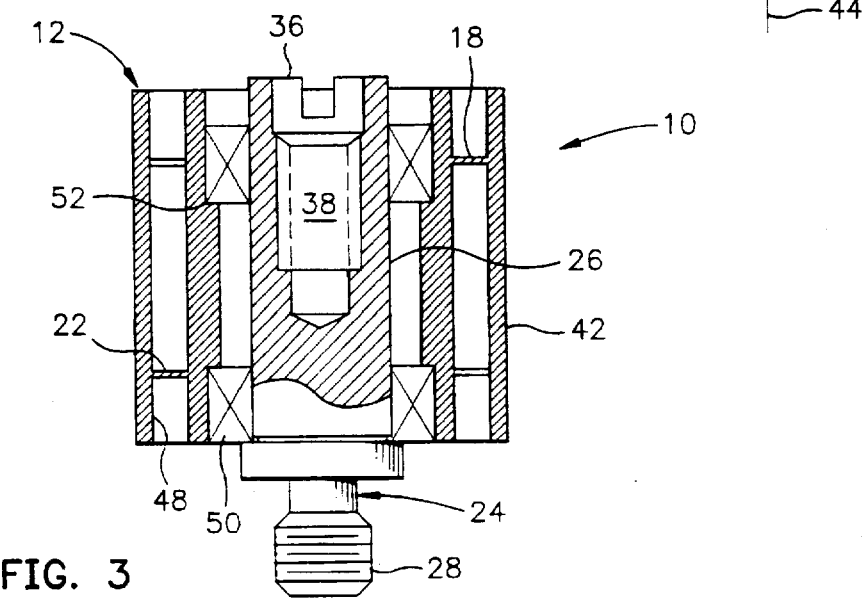
FIG. 3 is a partial cross-sectional view of the pivot bearing assembly of FIG. 1.

FIGS. 1–4 show several views of a pivot bearing assembly 10 incorporating the vibration isolator 12 of this invention. The three dimensions used herein to describe this invention are noted in FIGS. 1–2 by the three arrows labeled "Ax" (axial), "Ro" (rotational) and "Ra" (radial), each of which refers to an orthogonal basis oriented with respect to pivot bearing assembly 10. Vibration isolator 12 includes an outer member 14 and an inner member 16, both of which are rotationally symmetric and concentrically disposed. Inner member 16 is coupled to outer member 14 by a plurality of pliable elements exemplified by the pliable element 18. These pliable elements are disposed in two layers (FIGS. 3–4) and are separated from one another by the gaps exemplified by the air gap 20. FIG. 3 shows a first or upper layer including exemplary pliable element 18 and a second or lower layer including exemplary pliable element 22. The pliable elements are illustratively shown as symmetrically disposed within each layer and the pliable elements in the upper layer are illustratively shown as circumferentially offset from the pliable elements in the lower layer. Thus, in the top view shown in FIG. 1, the pliable elements in the upper layer are seen to alternate with those in the lower layer. The precise shape, number, orientation and disposition of the pliable elements exemplified by pliable elements 18 and 22 should be chosen to "tune" the decoupling effect of the vibration isolator 12 of this invention to minimize axial ("Ax") acoustic transmissivity of longitudinal actuator oscillations while providing rotational ("Ro") and radial ("Ra") rigidity.

Figure 6:
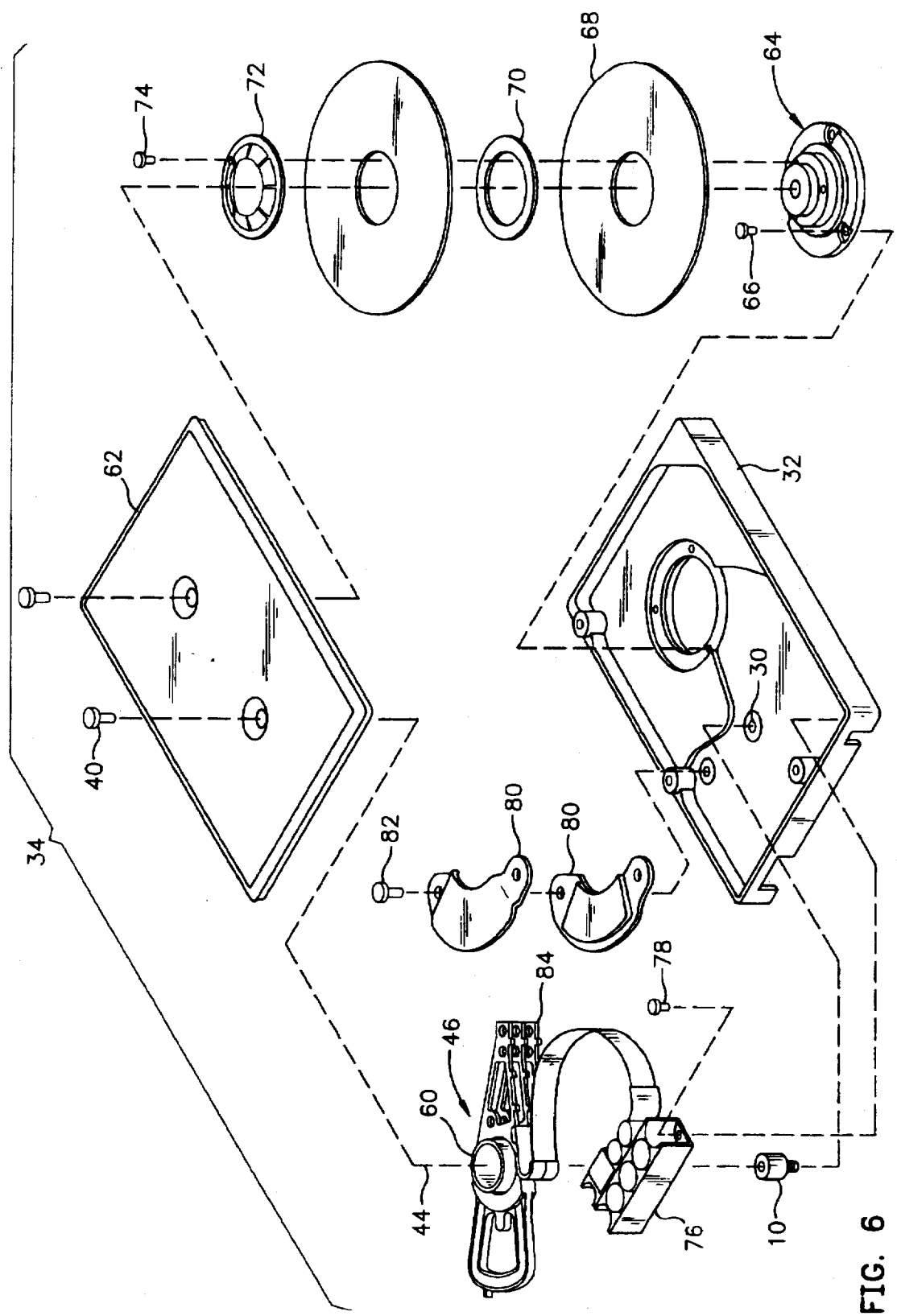
FIG. 6 is an exploded perspective view of a disk drive apparatus having a pivot bearing assembly incorporating the vibration decoupler of this invention.

Pivot bearing assembly 10 includes a pivot shaft 24 having an outer surface 26 and a threaded end 28 disposed for threading into a matching hole 30 in the base 32 of a disk drive 34 (FIG. 6). The other end 36 of pivot shaft 24 includes a threaded hole 38 adapted to receive a threaded bolt 40 (FIG. 6).

In FIG. 2, pivot shaft 24 is shown as disposed symmetrically about a pivot axis 44 and in fact pivot shaft 24 defines the location and orientation of pivot axis 44 when anchored to base 32 (FIG. 6). The outermost surface 42 of pivot bearing assembly 10 operates as a pivot sleeve disposed for attachment to the head stack assembly 46 in any useful manner known in the art, such as by an adhesive, an interference fit, or some other useful fastening means. Preferably, pivot bearing assembly 10 is fabricated as a separate unit with outer surface 42 adapted for retainable insertion into the swing-type head actuator body 60 (FIG. 6), where it is retained by friction, adhesive or external fasteners (not shown). FIGS. 1–4 illustratively show outer surface 42 to be the outer surface of outer vibration isolator element 14, which is rotatably coupled to pivot shaft 24 by means of the two pivot bearing elements exemplified by the pivot bearing element 50.

The preferred configuration of pivot bearing assembly 10 shown in FIGS. 1–4 should not be construed as limiting the vibration isolator of this invention. For instance, outer surface 26 of pivot shaft 24 could function as inner vibration isolator element 16 to which could be coupled by a plurality of webs the outer vibration isolator element 14, which then could be rotatably coupled by means of bearing elements to the inner surface of an outermost pivot sleeve (not shown) or directly to actuator body 60. Less advantageously, a separate pivot sleeve element could be added to pivot bearing assembly 10, between which could be disposed both bearing element 50 and vibration isolator 12.

Bearing element 50 may be embodied as a roller bearing or a standard commercially-available ball-bearing device suited for use with pivot bearing assembly 10. Inner vibration isolator element 16 includes the protruding ridges, exemplified by protruding ridge 52, necessary to retain bearing element 50 in a flush press-fit relationship in this embodiment. The fit between the two bearing elements exemplified by bearing element 50 and pivot shaft 24 is such that vibration isolator 12 rotates freely about pivot shaft 24, riding on the bearing elements.

Figure 4:
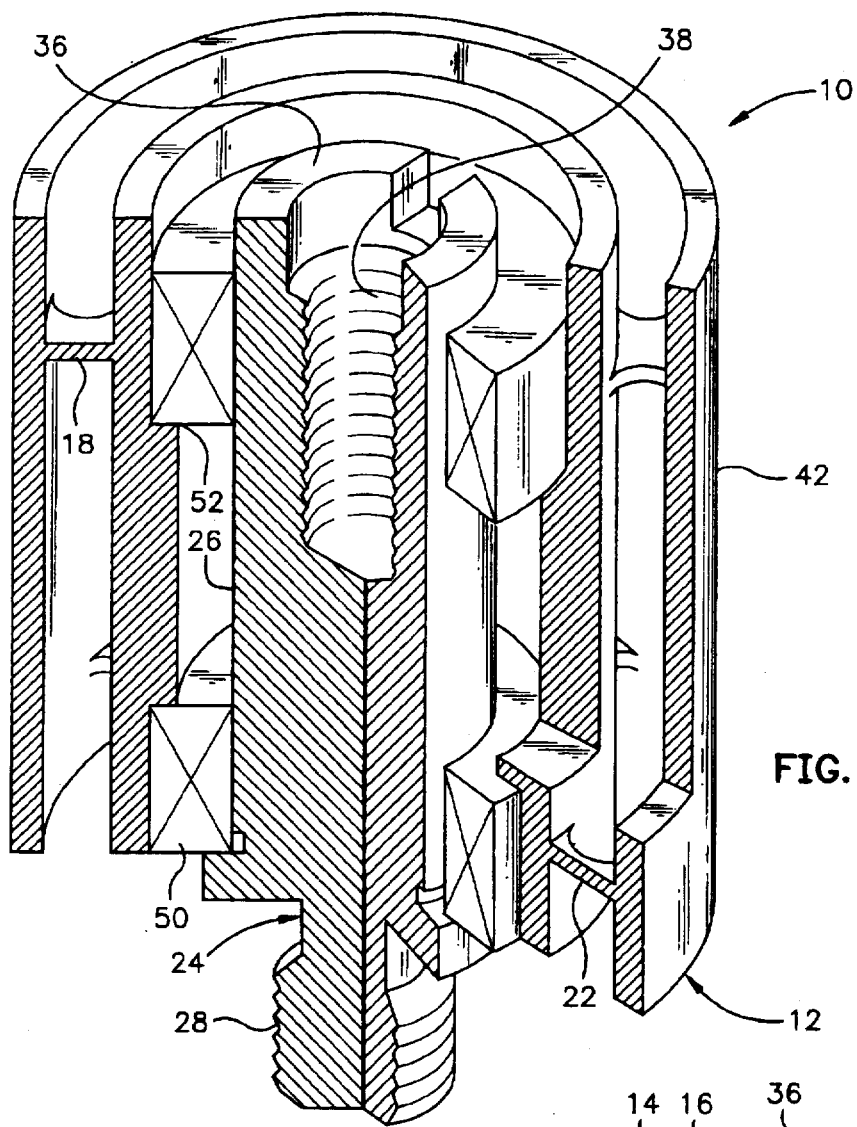
FIG. 4 is a cut-away perspective view of the pivot bearing assembly of FIG. 1 incorporating the vibration decoupler of this invention.

The pliable element disposition exemplified by pliable elements 18 and 22 may be appreciated with reference to FIG. 4, which shows a cut-away perspective view of pivot bearing assembly 10. The view in FIG. 4 is taken from a direction opposite that from which the cross-section view shown in FIG. 3 is taken, as seen by the arrows provided in FIG. 1. As with each of the pliable elements, one edge of pliable element 18 is joined to the outer surface of inner vibration isolator element 16 and the opposite edge is joined to the inner surface of outer vibration isolator element 14. Pliable element thickness, width and spacing is selected to provide rigid radial separation between inner and outer vibration isolator elements 14 and 16 while decoupling axial acoustic vibrations between elements 14 and 16.

Figure 5:
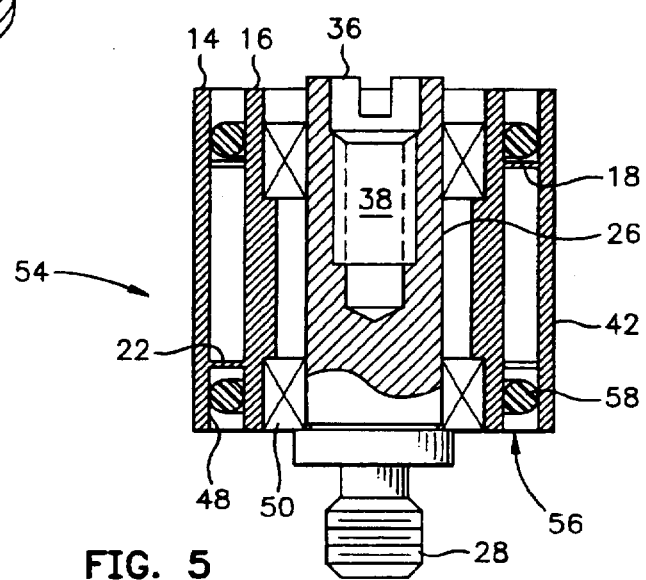
FIG. 5 is a cross-sectional view of a pivot bearing assembly incorporating an alternative embodiment of the vibration decoupler of this invention.

FIG. 5 shows a cross-sectional view of an alternative embodiment of this invention taken identically to the cross-section shown in FIG. 3. The pivot bearing assembly 54 includes all of the same elements discussed above in connection with pivot bearing assembly 10 shown in FIGS. 1–4. However, in addition to coupling inner and outer vibration isolator elements 14 and 16 by means of the pliable elements exemplified by pliable elements 18 and 22, the alternative vibration isolator 56 incorporates additional O-rings exemplified by the O-ring 58, which operates to introduce losses between inner and outer vibration isolator elements 14 and 16. As with each of the O-rings, O-ring 58 is coupled only by friction in the axial and circumferential directions to outer and inner vibration isolator elements 14 and 16 and is made from a viscoelastic material such as Neoprene™ that converts some portion of the acoustic vibrations to heat. Accordingly, these O-rings further reduce axial vibrations through absorption rather than tuned decoupling.

Vibration isolator 12 in FIGS. 1-4 is preferably fabricated as single injection-molded piece of thermoplastic material, which should be selected for low viscosity during molding to fully form the thin pliable elements. The material should also be chosen for insignificant shrinkage during curing to minimize uncontrolled changes in element tuning. The inventor has found polycarbonate to be too unstable and too susceptible to shrinkage for effective use in molding vibration isolator 12 and prefers a polyetherimide plastic such as the high-flow ULTEM™ manufactured by General Electric Corporation. For the actual physical sizes examined by the inventor, low molding viscosity is necessary to ensure precise formation of the several pliable elements exemplified by pliable elements 18 and 22.

In the alternative embodiment shown in FIG. 5, outer vibration isolator element 14 may be fabricated integrally as part of the plastic rotary actuator assembly body 60. Moreover, Vibration isolator 12 shown in FIG. 3 may also be fabricated integrally as part of the injection-molded actuator body 60 if desired. In either case, the remaining components of pivot bearing assembly 10 (or assembly 54 from FIG. 5) would then be assembled by inserting them into the integral actuator body (not shown).

FIG. 6 shows an exploded perspective view of a disk drive 34 incorporating pivot bearing assembly 10 (or assembly 54 from FIG. 5). Disk drive 34 includes base 32, a drive housing cover 62, a disk motor assembly 64 with the fasteners 66 for securing motor assembly 64 to base 32, a plurality of storage disks exemplified by disk 68, a storage disk spacer 70, a disk assembly clamp 72 and the fasteners 74 for securing the disk array to motor assembly 64, a portion of head stack assembly 46 including read/write electronics 76, a fastener 78 for securing read/write module 76 to base 32, and an actuator magnet assembly 80 with the fasteners 82 for securing actuator magnet assembly 80 to base 32. Pivot bearing assembly 10, incorporating vibration isolator 12 of this invention, is secured to base 32 by turning threaded end 28 of pivot shaft 24 into threaded hole 30. Fastener 40 is passed through cover 62 and turned into threaded hole 38 in the top of pivot shaft 24, thereby firmly securing pivot bearing assembly 10 to both top and bottom of disk drive 34. Head stack assembly 46 is fixed to outer surface 42 of pivot bearing assembly 10 so that actuator motor assembly 80 can swing head stack assembly 46 back and forth about pivot axis 44 to move read/write heads (not shown) into position with respect to the surfaces of rotating disks exemplified by disk 68. Head stack assembly 46 includes a plurality of arms exemplified by arm 84, the tip of which is disposed for mounting a head gimbal assembly (not shown) in any suitable manner known in the art.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

I claim:

1. A pivot bearing assembly for use in a disk drive having a base and a head stack assembly, the pivot bearing assembly for rotatably coupling the head stack assembly to the base, the pivot bearing assembly comprising:

a pivot shaft having a longitudinal axis and one end affixed to the base;

an outermost surface of the pivot bearing assembly for coupling to the head stack assembly;

bearing means disposed between the pivot shaft and the outermost surface to rotatably couple the outermost surface to the pivot shaft; and a vibration isolator which comprises:

a cylindrical inner member and a cylindrical outer member disposed between the pivot shaft and the outermost surface, the outer member surrounding the inner member; and a first layer and a second layer longitudinally spaced apart from the first layer, the layers concentric about the longitudinal axis and for connecting the inner and outer members such that the inner member is longitudinally moveable with respect to the outer member at acoustic frequencies;

wherein acoustic vibrations in the outermost surface are decoupled from the base.

2. The pivot bearing assembly of claim 1 wherein each layer comprises:

a plurality of pliable elements each having an edge connected to the inner member and having an opposite edge connected to the outer member.

3. The pivot bearing assembly of claim 2 wherein:

the vibration isolator is formed as a unitary molded piece.

4. The pivot bearing assembly of claim 3 wherein the unitary molded piece comprises:

a polyetherimide plastic resin.

5. The pivot bearing assembly of claim 2 wherein:

the plurality of pliable elements each is disposed to be substantially more resistant to elongation than to flexure, thereby retaining radial and rotational rigidity while decoupling longitudinal vibration.

6. The pivot bearing assembly of claim 5 wherein the vibration isolator comprises:

a unitary molded piece of material including a polyetherimide plastic resin.

7. The pivot bearing assembly of claim 2 wherein the vibration isolator further comprises:

a plurality of O-rings each separating the inner and outer members.

8. The pivot bearing assembly of claim 1 wherein: the outermost surface is part of the outer member.

9. The pivot bearing assembly of claim 1 wherein each layer comprises: a plurality of pliable elements concentrically arranged about the longitudinal axis wherein the pliable elements of the first layer are circumferentially offset from the pliable elements of the second layer.

10. A disk drive comprising:

a base;

a head stack assembly; and a pivot bearing assembly for rotatably coupling the head stack assembly to the base;

the pivot bearing assembly comprising:

a pivot shaft having a longitudinal axis and one end affixed to the base; bearing means disposed between the pivot shaft and the head stack assembly to rotatably couple the head stack assembly to the pivot shaft; and a vibration isolator which comprises:
- a cylindrical inner member and a cylindrical outer member disposed between the pivot shaft and the head stack assembly, the outer member surrounding the inner member; and
- a first layer and a second layer longitudinally spaced apart from the first layer, the layers concentric about the longitudinal axis and for connecting the inner and outer members such that the inner member is longitudinally moveable with respect to the outer member at acoustic frequencies;

wherein acoustic vibrations in the head stack assembly are decoupled from the base.

11. The disk drive of claim 1 wherein each layer comprises:
- a plurality of pliable elements each having an edge connected to the inner member and having an opposite edge connected to the outer member.

12. The disk drive of claim 11 wherein:
the vibration isolator is formed as a unitary molded piece.

13. The disk drive of claim 12 wherein:
the head stack assembly includes a molded actuator body; and
the vibration isolator is molded unitarily within the molded actuator body.

14. The disk drive of claim 12 wherein the unitary molded piece comprises:
polyetherimide plastic resin.

15. The disk drive of claim 11 wherein:
the plurality of pliable elements each is disposed to be substantially more resistant to elongation than to flexure, thereby retaining radial and rotational rigidity while decoupling longitudinal vibration.

16. The disk drive of claim 15 wherein the vibration isolator comprises:
a unitary molded piece of material including a polyetherimide plastic resin.

17. The disk drive of claim 11 wherein the vibration isolator further comprises:
a plurality of O-rings each separating the inner and outer members.

18. The disk drive of claim 10 wherein each layer comprises: a plurality of pliable elements concentrically arranged about the longitudinal axis wherein the pliable elements of the first layer are circumferentially offset from the pliable elements of the second layer.

* * * * *